United States Patent [19]

Bowden, Jr. et al.

[11] Patent Number: 5,794,338
[45] Date of Patent: Aug. 18, 1998

[54] METHOD FOR REPAIRING A TURBINE ENGINE MEMBER DAMAGED TIP

[75] Inventors: Joseph H. Bowden, Jr., Mason; Lawrence J. Roedl, West Chester, both of Ohio

[73] Assignee: General Electric Company, Cincinnati, Ohio

[21] Appl. No.: 825,982

[22] Filed: Apr. 4, 1997

[51] Int. Cl.$^6$ ................................................. B23P 15/00
[52] U.S. Cl. ................... 29/889.1; 29/889.7; 29/402.09; 29/402.18
[58] Field of Search ........................ 29/889.1, 889.72, 29/889.721, 889.7, 402.03, 402.04, 402.05, 402.06, 402.07, 402.09, 402.16, 402.18

[56] References Cited

U.S. PATENT DOCUMENTS

| | | | |
|---|---|---|---|
| 4,028,788 | 6/1977 | DeMusis | 29/156.8 |
| 4,128,929 | 12/1978 | DeMusis | 29/156.8 |
| 4,176,433 | 12/1979 | Lee et al. | 29/156.8 |
| 4,214,355 | 7/1980 | Zelahy | 29/156.8 |
| 4,657,171 | 4/1987 | Robins | 228/119 |
| 4,808,055 | 2/1989 | Wertz et al. | 416/224 |
| 4,837,389 | 6/1989 | Shankar et al. | 428/668 |
| 4,893,388 | 1/1990 | Amos et al. | 29/156.8 |
| 4,897,519 | 1/1990 | Clark et al. | 219/76.14 |
| 4,903,888 | 2/1990 | Clark et al. | 29/402.18 |
| 4,940,390 | 7/1990 | Clark et al. | 416/241 |
| 5,031,313 | 7/1991 | Blair et al. | 29/402.06 |
| 5,048,183 | 9/1991 | Cang et al. | 29/889.7 |
| 5,071,054 | 12/1991 | Dzugan et al. | 228/119 |
| 5,183,390 | 2/1993 | Amos | 416/224 |
| 5,193,736 | 3/1993 | Marijnissen et al. | 228/119 |
| 5,655,701 | 8/1997 | Quattrocchi et al. | 29/889.1 |
| 5,697,151 | 12/1997 | Werner et al. | 29/889.1 |

*Primary Examiner*—Irene Coda
*Attorney, Agent, or Firm*—Andrew C. Hess; David L. Narciso

[57] ABSTRACT

A method for repairing a damaged tip of a turbine engine member, for example a tip of a high temperature operating turbine blade, having a designed length and an environmental resistant coating at least on an outer wall of the member and extending at least onto the tip, includes removing the damaged tip without first removing coating, on a wall adjacent the tip. This provides a preform end surface to which is bonded a replacement tip material having a second length greater than the designed length. Then a portion of the replacement tip material is removed to provide the member with a repaired member tip and of substantially the designed length while retaining the coating on the wall adjacent the repaired tip.

7 Claims, 2 Drawing Sheets

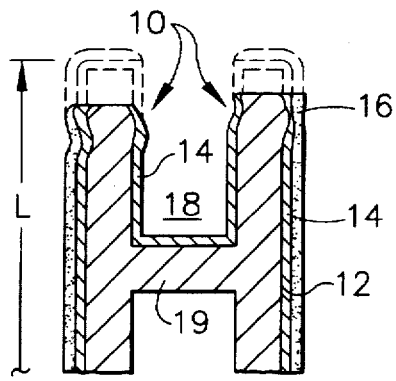
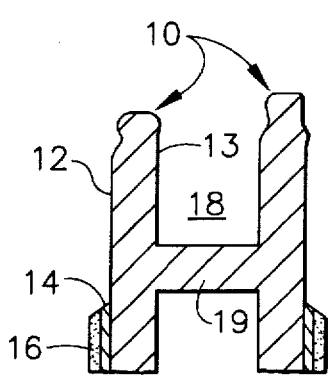
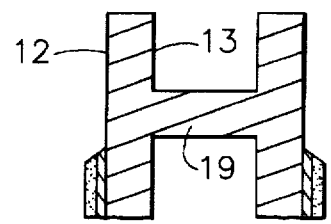
FIG. 1  FIG. 2  FIG. 3
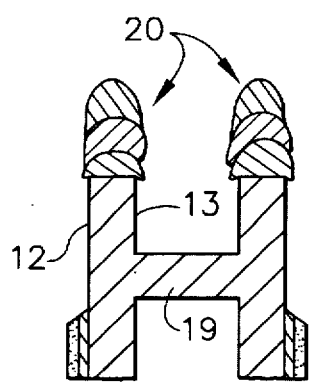
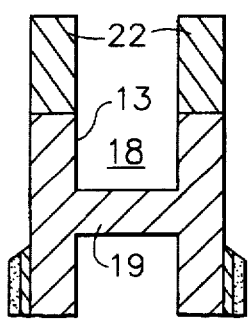
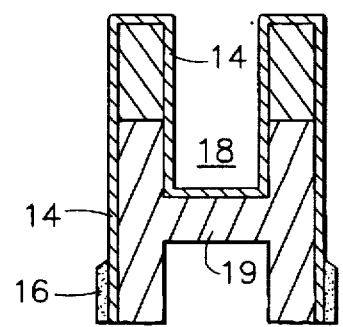
FIG. 4  FIG. 5  FIG. 6

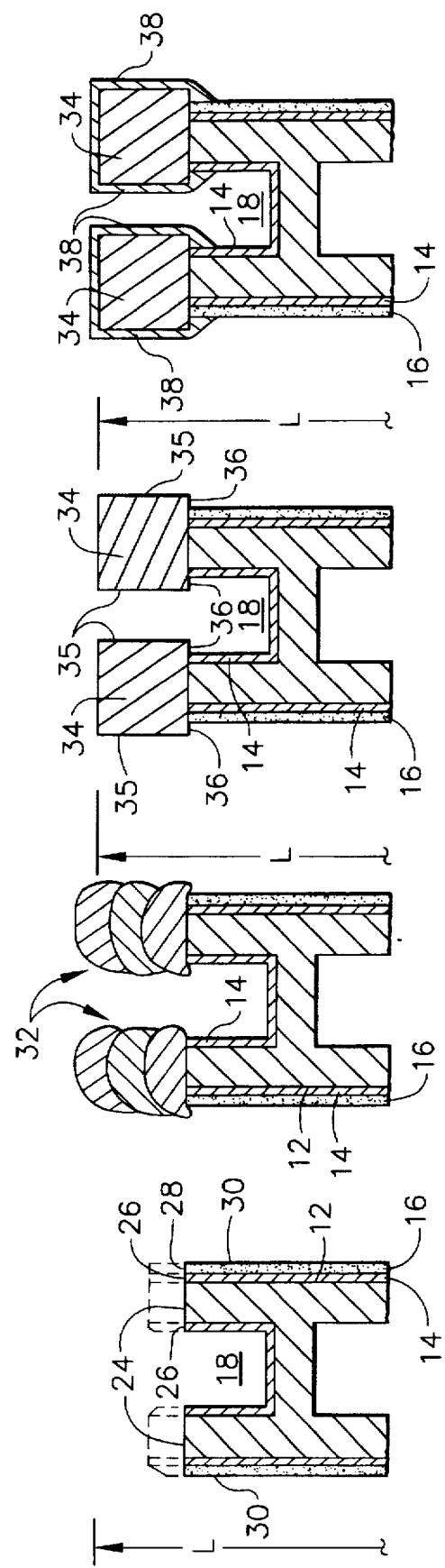

5,794,338

METHOD FOR REPAIRING A TURBINE ENGINE MEMBER DAMAGED TIP

BACKGROUND OF THE INVENTION

This invention relates to the repair of turbine engine members, and, more particularly, to the repair of a damaged tip of a turbine engine blade which includes an outer wall having thereon an environmental resistant coating.

During operation of a turbine engine, for example a gas turbine engine, the tips of such members as turbine blades, vanes, and seal teeth can become damaged. This can occur to a member's tip, between relatively moving members, as a result of interference of the tip with an opposing member, based at least in part on a difference in thermal expansion and contraction characteristics between such members, or as a result of impact of air-borne particles or corrosive gases, or a combination of such events.

Because such turbine engine members are relatively costly to manufacture, the art has developed a variety of repairs for such members to avoid a complete replacement. Such DeMusis U.S. Pat. Nos. as 4,028,788 (patented Jun. 14, 1977) and 4,128,929 (patented Dec. 12, 1978) relate to the repair of end or tip shrouds of turbine engine blades by welding material to build up a damaged portion and then reshaping the end. A method for replacing a tip cap of a turbomachinery blade including an airfoil-shaped hollow body is described in U.S. Pat. No. 4,214,355—Zelahy, patented Jul. 29, 1980. In addition, repair or replacement of a projection, such as a seal tooth, is shown in U.S. Pat. No. 4,657,171—Robins, patented Apr. 14, 1987. In that patent, the repair is accomplished by removing a portion of the tip of the tooth projection, bonding thereon a replacement material, and then reshaping the projection.

The tips of modern gas turbine engine members, particularly high temperature operating air cooled turbine blades having a generally radially extending hollow tip of the type shown in the above identified Zelahy patent, frequently include a complex environmental resistant coating bonded particularly to an outer wall of the blade. For example, one such complex coating bonded to the wall includes a first portion of an aluminide coating, such as the commercially available Codep aluminide coating, one form of which is described in U.S. Pat. No. 3,667,985—Levine et al., patented Jun. 6, 1972. Then at least the outer wall includes a commercially available thermal barrier, ceramic type coating, generally called a TBC coating, bonded over the aluminide coating. Forms of TBC coating are described in a variety of publications including U.S. Pat. Nos. 4,055,705—Stecura et al. (patented Oct. 25, 1977), and 4,095,003—Weatherly et al. (patented Jun. 13, 1978. One form of such a TBC coating commonly used in the gas turbine art is based on zirconia stabilized with yttria, for example 92 wt. % zirconia stabilized with 8 wt. % yttria.

The presence of such a complex, relatively costly coating complicates the repair of the member tip. Common practice for repair of such a coated blade tip has included stripping the complex coating from a blade end portion which includes the damaged tip and the hollow tip interior. This exposes the substrate of the tip body, of an adjacent portion of the blade body, and of the tip hollow interior. It has been observed that such stripping tends to remove a portion of the substrate, thinning the wall and edges and jeopardizing the operating life and a later repair of the member. After stripping, the damaged tip body is removed, replaced with new material and reshaped. Because the coating has been removed from a portion of the wall adjacent the damaged tip as well as within the tip hollow interior, it is necessary to recoat the entire replacement tip, the exposed body and the tip hollow interior. As can be appreciated, such a repair, which includes coating stripping, coating replacement and associated heat treatments and inspections, can add significantly to the cost of tip repair of such a coated member and can limit operating life and repairability of the member.

BRIEF SUMMARY OF THE INVENTION

The present invention, in one form, provides a method for repairing a damaged tip of a turbine engine member having a designed length and including an outer wall having thereon an environmental resistant coating extending at least onto the tip. The method includes removing the damaged, coated tip to provide a preform end surface on the member without first removing any of the coating on the outer wall adjacent the tip. The coating is retained on the wall adjacent the preform end surface, as well as within any hollow tip interior or recess. A replacement tip material is bonded to the end surface to provide a repaired member preform having a second length greater than the designed length. Then a portion of the replacement tip material is removed to provide the member with a repaired member tip of substantially the designed length, while retainig the coating on the wall adjacent the repaired member tip.

BRIEF DESCRIPTION OF THE DRAWING

FIG. 1 is a fragmentary sectional view of a coated, damaged blade tip having a hollow interior or recess at the tip.

FIGS. 2 through 6 are a diagrammatic sequence of steps showing one current practiced method for repairing the damaged blade tip of FIG. 1.

FIGS. 7 through 9 are a diagrammatic sequence of steps showing the present invention for repairing the damaged blade tip of FIG. 1.

FIG. 10 is a fragmentary sectional view of the blade tip repaired according to the present invention and coated with an additional coating at least to the original environmental coating.

DETAILED DESCRIPTION OF THE INVENTION

Current established repair of the damaged, environmentally coated tip of an air cooled gas turbine engine high temperature operating turbine blade, for example of the type shown in the fragmentary sectional view of FIG. 1, requires removal of the coating not only from the damaged tip but also from the blade surface adjacent the tip to be repaired. Generally the blade tip is damaged to the point at which the blade is considered unserviceable, the tip being worn, abraded, oxidized, etc. away to a length significantly less than the length to which it was designed, herein call the designed length. Such wear frequently is uneven, including for example of uneven length between the concave and convex sides of the blade. Such a typical condition is shown in FIG. 1 in which the original condition and designed length of the blade is shown in phantom. After coating removal according to current practice, the condition of the blade is shown in the diagrammatic sectional view of FIG. 2. This coating removal results in additional effort and expense, and, in addition, can result in a reduction in blade operating life due to the removal of parent or substrate material and thinning of cavity walls and edges. The present invention simplifies such a repair by providing a method which does not require any additional blade coating removal prior to or during repair of such damaged blade tip.

The invention will be more clearly understood by reference to the drawings and in connection with the specific examples presented below. The embodiment of FIG. 1 depicts the tip of a hollow, air cooled turbine blade generally of the type shown in the above-identified Zelahy U.S. Pat. No. 4,214,355, with a damaged tip shown generally at 10 and a substantially radially extending designed length L. For example, designed length L can be measured from a point on the root or dovetail of the blade, not shown, to establish the blade's relative radial position in the engine. In connection with the blade shown in the drawings, the designed length L was measured from a blade dovetail serration. The blade includes an outer wall 12, defining a blade hollow interior, and a tip inner wall 13, defining an open recess 18. Included on outer wall 12 of the tip is a complex environmental resistant coating combination including a first coating 14 of an aluminide, such as the above describe Codep aluminide coating, bonded at the surface of outer wall 12. Bonded over coating 14 at outer wall 12 is a ceramic type second coating 16 of the above described TBC type. The first coating 14 extends into the recess 18 of tip 10 for protection of that portion of the blade tip.

A currently established repair method for damaged blade tip 10 is shown in the diagrammatic sequence of FIGS. 2 through 6. In FIG. 2, the coating combination is removed, such as by grit blasting, mechanical blending, etc., from the damaged blade tip as well as from the outer wall 12 adjacent the damaged tip and from within recess 18. The damaged tip 10 is removed, as in FIG. 3, and a preform replacement tip material 20 is bonded, such as by a series of welding steps, to the wall, as shown in FIG. 4. Thereafter, preform replacement tip material 20 is shaped, such as by machining, grinding, etc., to provide a replacement tip 22, FIG. 5, which must then be recoated at least with the environmental coating 14. This then provides the blade with a repaired tip as shown in FIG. 6. As was mentioned above, this known method involves the costly and time consuming steps of first stripping the environmental coating not only from the damaged tip but also from outer walls adjacent the damaged tip, and coating from within the tip recess 18 which is not in need of repair. In addition, such stripping can result in removal and thinning of the outer wall and edges, particularly of the blade outer wall radially inward from tip shelf 19, thereby reducing the potential operating life of the blade. Also, such thinning jeopardizes the possibility of subsequent blade tip repairs after later engine operation.

The present invention significantly simplifies the above described currently practiced type of tip repair by eliminating needless stripping or removal of any tip coating. As a result, when the present invention is practiced, such previously required processing steps including pre-weld or post-weld heat treatments, wall thickness or airflow inspections, and X-ray inspection, among others, are no longer required.

Reference to the sequence of FIGS. 7 through 9 shows one form of the present invention to repair the damaged tip 10 of the coated blade of FIG. 1. Instead of first removing the coating as in FIG. 2, the damaged tip 10 shown in phantom in FIG. 7, including any of its adhering coating, was removed, as shown in FIG. 7, for example as by grinding, machining, etc., to provide a preform end surface 24 which includes edges 26 and 28, respectively, of the complex outer coating 14, 16, as well as the edge 26 of coating 14 in open recess 18. The coating was retained on walls adjacent the damaged tip as shown in FIG. 7.

In order to facilitate bonding of a replacement tip to surface 24, in an embodiment in which surface contamination can affect bonding, the exposed surface 30 of coating 16 was cleaned to remove surface contaminants, such as oxides developed during engine operation, substantially without removing the coating In this example, a clean substrate was provided for bonding, such as fusion welding. Such cleaning can be accomplished by such non-abusive methods as a light mechanical treatment, for example wire brushing.

As shown in FIG. 8, a replacement tip material 32 was bonded by fusion welding in a series of welding steps onto preform end surface 24, including overhanging the coating edges 26 and 28. This provided the repaired member preform shown in FIG. 8 having a second length greater than designed length L, as shown in that Figure. Then a portion of replacement tip material 32 was removed, such as by grinding, machining, etc., as shown in FIG. 9, to provide the blade member with a repaired member tip 34 of substantially the designed length L, while retaining coating 14, 16 on the outer wall adjacent the repaired member tip and coating 14 on the wall of recess 18. In the embodiment shown in FIG. 9, the portion of replacement tip material 32 was removed in a manner which provided a positive step 36 between replacement tip 34 and the coatings: 16 on the outer wall and 14 on the wall of recess 18. This was done to assure no wall thinning or damage to the surface of such adjacent coatings 14 and 16 and for use in avoiding wall thinning in any necessary subsequent repairs after engine operation of the repaired tip.

Replacement tip material 32 can be provided from an alloy which is resistant to environmental oxidation and corrosion during engine operation. In such a case, repaired member tip 34 does not require additional protective coating. However, in some examples where the material of replacement tip 34 has inadequate environmental resistance or the intended use is particularly strenuous, an additional environmental resistant coating 38 in FIG. 10 can be applied.

In one specific example of the practice of the present invention, an air cooled high pressure turbine blade from operation in a gas turbine engine was inspected for damage and serviceability. It was determined that the blade tip, of the general type shown in FIG. 1, was damaged and needed repair, and that the blade could be returned to service after repair. The blade had been cast from a Ni base superalloy sometimes referred to as Rene' N5 alloy, forms of which are described in U.S. Pat. No. 5,173,255—Ross et al., patented Dec. 22, 1992. For environmental protection, complex coating 14, 16 in the drawing comprised a first coating 14 of a commercially used platinum aluminide coating applied to the outer wall of the blade, as shown in FIG. 1, and an outer coating 16 of the above described TBC coating of zirconia stabilized with yttria. The platinum aluminide initially had been applied generally by first electrodepositing platinum and then aluminiding the platinum with the above identified Codep coating process. The platinum aluminide coating extended within recess 18 but the TBC coating was applied only to the outer wall, as shown in the drawing.

To prepare the blade for repair, the damaged tip was removed by grinding without removing the coating on walls adjacent the removed damaged tip, as shown in FIG. 7. This provided the preform end surface 24 on the blade. Then coating surface 30 adjacent end surface 24 was cleaned prior to welding with a wire brush to remove products from engine operation, including surface oxidation, corrosion, foreign particles, etc. In this way, the tip was better prepared for fusion welding of a replacement tip material 32.

The replacement tip material 32 was applied by fusion welding with a weld filler material of Rene' 142 Ni base superalloy, forms of which are described in U.S. Pat. No. 4,169,742—Wukusick et al., patented Oct. 2, 1979. Welding was conducted in about 3 welding passes, as shown in FIG. 8, to provide a repaired blade preform. This was sufficient to create a replacement tip material 32, as shown in FIG. 8, of a second length greater than the designed length L, which in this example was a length extending from a blade dovetail serration, generally radially in respect to the blade's intended position in the engine. Evaluation of the weld area at preform end surface 24, between that end surface and the Rene' 142 alloy weld material, showed the platinum aluminide coating and the TBC coating to be intact. Any portion of the platinum aluminide coating which diffused into the weld material during fusion welding washed to the surface of the weld where it was removed by subsequent grinding when the replacement tip material was shaped, as described below.

After welding, a portion of the replacement tip material was removed by grinding on a belt grinder to the designed length L. Then, portions of lateral walls 35 of replacement material 32 was removed to provide a repaired blade tip 34, leaving a positive step 36 of up to about 0.005" between replacement material 32 and coating 16 on the outer coated wall as well as coating 14 on the wall 13 of recess 18, as shown in FIG. 9. This was done to protect the adjacent coated wall, to avoid wall thinning, and to enable any necessary later blade tip repair by a process which might result in wall thinning because precise location of the substrate wall might be obscured.

Because the environmental resistance of Rene' 142 material was adequate for the intended use of the repaired blade, it was not necessary to apply any additional coating to the repaired blade tip. However, in another example in which both the blade and the replacement material were from still different Ni base superalloys, an additional environmental resistant coating, 38 in FIG. 10, was applied to the surface of the repaired blade tip 34. In that specific example, the Ni base superalloy from which the blade was cast was the commercially available Rene' 125 alloy consisting nominally by weight of about: 10% Co, 4.8% Al, 9% Cr, 2.5% Ti, 3.8% Ta, 7% W, 2% Mo, 1.5% Hf, 0.1% C, 0.01% B, 0.05% Zr, with the balance Ni and incidental impurities. The weld replacement material was the commercially available IN 625 Ni base alloy which had insufficient environmental resistance for the particular application of the blade. The additional coating 38 was an aluminide coating, sometimes called Codal coating, applied from a slurry of powder and heat treated at about 1900° F., generally as described in U.S. Pat. No. 4,004,047—Grisik, patented Jan. 18, 1977.

The present invention provides a repair method which eliminates costly steps required in current repairs, protects the operating life of the repaired member, and enables subsequent repair of the repaired member after use. The present invention has been described in connection with specific examples and embodiments as typical of rather than in any way limiting on the scope of the present invention. It will be understood by those skilled in the arts associated with this invention that it is capable of variations and modifications without departing from the scope of the appended claims.

We claim:

1. In a method for repairing a damaged tip of a turbine engine member having a designed length, the member including an outer wall having thereon an environmental resistant coating extending at least onto the tip, the steps of:

removing the damaged tip to provide a preform end surface on the member, while retaining the coating on the outer wall adjacent the preform end surface;

bonding replacement tip material to the preform end surface to provide a repaired member preform having a second length greater than the designed length; and, removing a portion of the replacement tip material to provide the member with a repaired member tip and with substantially the designed length, while retaining the coating on the wall adjacent the repaired member tip.

2. The method of claim 1 in which:

the member is a turbine engine blade including a generally radially extending damaged tip; and, the coating includes an inner portion of an aluminide coating, and an outer portion bonded with the inner portion and comprising a thermal barrier coating.

3. The method of claim 2 in which:

an exposed surface of the coating on the outer wall adjacent the preform end surface is cleaned prior to bonding while retaining the coating on the wall;

the replacement tip material overhangs the coating on the wall adjacent the replacement tip material; and, the portion of the replacement tip material is removed in a manner which retains a positive step between the coating on the wall and the replacement tip material.

4. The method of claim 1 in which an additional environmental resistant coating is applied over the repaired member tip.

5. In a method for repairing a damaged airfoil shaped tip of an air cooled turbine engine blade having a designed length extending generally radially of the blade, an outer wall defining a hollow interior, a tip inner wall defining an open recess in the tip, the outer and tip inner walls including thereon environmental resistant coating extending at least onto the tip, the steps of:

removing the damaged tip to provide a preform end surface on the blade while retaining the coating on the outer wall and tip inner wall adjacent the preform end surface;

welding replacement tip material to the preform end surface to provide a repaired blade preform having a second generally radially extending length greater than the designed length, the replacement tip material overhanging the coatings on the outer wall and the tip inner wall, adjacent the replacement tip material; and, removing a portion of the replacement tip material to provide the blade with a repaired blade tip and of substantially the designed length, while retaining the coatings, on the outer wall and tip inner wall adjacent the repaired blade tip, the removing being in a manner which retains a positive step between the repaired blade tip and the coatings on the outer wall and on the tip inner wall.

6. The method of claim 5 in which an exposed surface of the coating on the outer wall adjacent the preform end surface is cleaned prior to welding while retaining the coating on the outer wall.

7. The method of claim 5 in which an additional environmental resistant coating is applied over the repaired blade tip.

* * * * *